(No Model.)
W. B. HUGHES.
PREPARING CHARGES FOR AND CHARGING METALLURGICAL FURNACES.
No. 524,551. Patented Aug. 14, 1894.
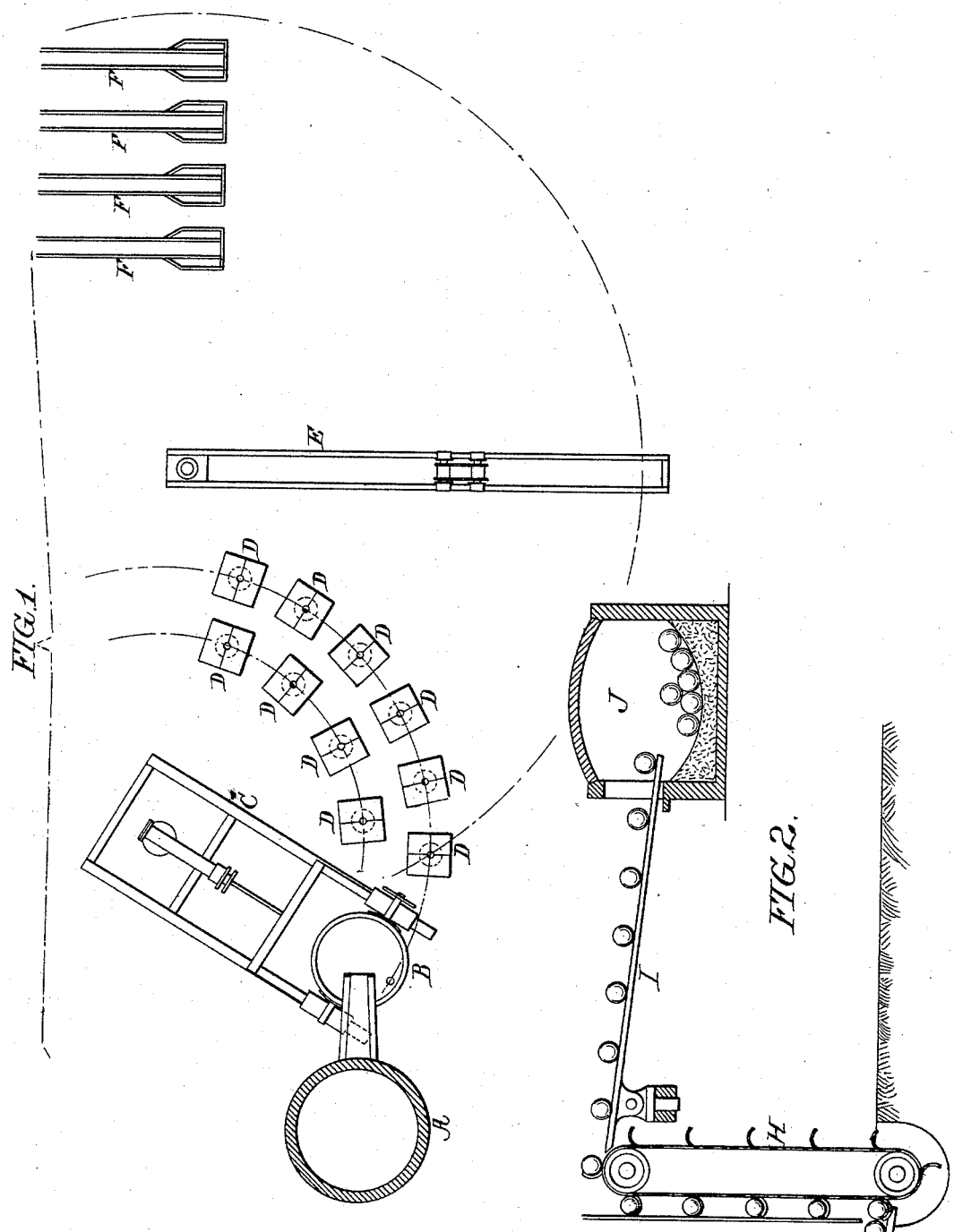
Witnesses:
R. Schleicher
Hamilton D. Turner
Inventor:
William B. Hughes
by his Attorneys
Howson & Howson

UNITED STATES PATENT OFFICE.

WILLIAM BISHOP HUGHES, OF PHILADELPHIA, PENNSYLVANIA.

PREPARING CHARGES FOR AND CHARGING METALLURGICAL FURNACES.

SPECIFICATION forming part of Letters Patent No. 524,551, dated August 14, 1894.

Application filed June 16, 1893. Serial No. 477,798. (No model.)

*To all whom it may concern:*

Be it known that I, WILLIAM BISHOP HUGHES, a citizen of the United States, residing in Philadelphia, Pennsylvania, have invented certain Improvements in Preparing Charges for and Charging Metallurgical Furnaces, of which the following is a specification.

The object of my invention is to simplify, cheapen and quicken the operation of charging metallurgical furnaces, and especially open hearth steel furnaces, an object which I attain in the manner hereinafter set forth, reference being had to the accompanying drawings, in which—

Figure 1, represents, in plan, certain devices which may be employed in carrying out my invention; and Fig. 2, represents a sectional elevation of the further devices which may be employed.

In the manufacture of steel from pig iron and scrap in open hearth furnaces the methods at present employed for charging the furnace are not only laborious and expensive, but they are also slow and are liable to cause injury to the furnace. Two methods are commonly employed, the first method being exclusively a hand method and requiring the employment of a large number of men to carry the pig iron and scrap to the furnace into which the charge is shoveled, the latter operation being extremely exhausting owing to the high heat of the furnace and being so slow that much loss of heat is occasioned by reason of the fact that the charging door is kept open for so long a time. The oxidation of the pieces of scrap upon the floor or bed of the furnace, moreover, has a tendency to rapidly destroy said bed and causes frequent and expensive shut downs for the purpose of renewing the same. The second plan of charging is to pack the pig iron and scrap into boxes which are mounted upon the end of a power actuated peel or bar, the box-carrying end of the latter being thrust into the furnace and then reversed so as to dump the contents of the box onto the bed of the furnace preparatory to the withdrawal of the bar and a repetition of the operation. These charging machines, however, are cumbersome and expensive and the portions which are thrust into the furnace are rapidly destroyed by the heat. In order to overcome the objections to both of these plans I propose to melt the stock and cast it into blocks of such shape and size that a number of them sufficient to constitute the desired charge for the furnace can be rapidly fed into the latter, preferably by gravity, and properly distributed over the bed of the furnace, the blocks being taken from the molds as soon as there is formed, upon each block, an outer shell of sufficient hardness to permit handling of the block. This condition is reached while the blocks are still in a highly heated state, in fact, while they are, throughout the greater portion of their bulk, still in a molten condition, hence, the operation of the furnace is very materially facilitated as compared with one receiving a cold charge, while there is no liability to rapidly destroy the bed of the furnace by the oxidation thereon of detached pieces of iron or steel scrap, in fact, the operation of the furnace closely approximates to that which would be possible if the charge were introduced in a molten state.

My present invention is not limited to any special means or mechanism for effecting the charging operation, but in the drawings I have shown, for example, a simple plant of machinery whereby my invention may be carried into effect, A representing a vessel, furnace, or cupalo in which the stock for the charge is melted, this vessel discharging into a ladle B carried by a suitable crane C so that the molten stock can be drawn off into a series of molds D and thus cast into blocks of the desired shape and size for the charge.

As soon as the blocks have become sufficiently cool to retain their shape, the molds are separated and the blocks are carried by a crane E onto the receiving ends of runways F which deliver them to one or more conveyers or elevators H whereby they are raised onto another runway I by which they are delivered into the furnace, said runway I being, by preference, adjustably mounted, so that its delivery end can be raised, lowered, or swung laterally in order to distribute the blocks with a reasonable degree of uniformity over the bed of the furnace.

The blocks are preferably cast in spherical or cylindrical form so that they will readily roll by gravity along the runways, although they may be of cubical or other form so as to slide instead of roll, or the runways may have conveyers for feeding the blocks forward.

It will be evident that a plant of machinery such as I have illustrated can be operated by a very few attendants and that the blocks necessary to constitute the charge of the furnace can be fed into the latter very rapidly so that not only is the labor of charging the furnace much reduced, but the character of this labor is also changed and calls for no violent and exhausting exercise of physical strength, considerable economy moreover, being effected by reason of the quick charging of the furnace and the saving of heat thereby attained.

Having thus described my invention, I claim and desire to secure by Letters Patent—

1. The mode herein described of preparing charges for and charging metallurgical furnaces, said mode consisting in first casting the stock into the form of blocks, and then feeding said blocks in rapid succession into the furnace as soon as they have become sufficiently cool to permit handling, but while they are still in a highly heated condition, substantially as specified.

2. The mode herein described of preparing charges for and charging metallurgical furnaces, said mode consisting in first melting the stock, then casting the same into the form of spherical or cylindrical blocks, and then causing said blocks to roll by gravity into the furnace, substantially as specified.

In testimony whereof I have signed my name to this specification in the presence of two subscribing witnesses.

WILLIAM BISHOP HUGHES.

Witnesses:
FRANK E. BECHTOLD,
H. F. REARDON.